Dec. 16, 1952     C. H. PETERSON     2,621,456
POTATO DIGGER
Filed March 1, 1947             6 Sheets-Sheet 1
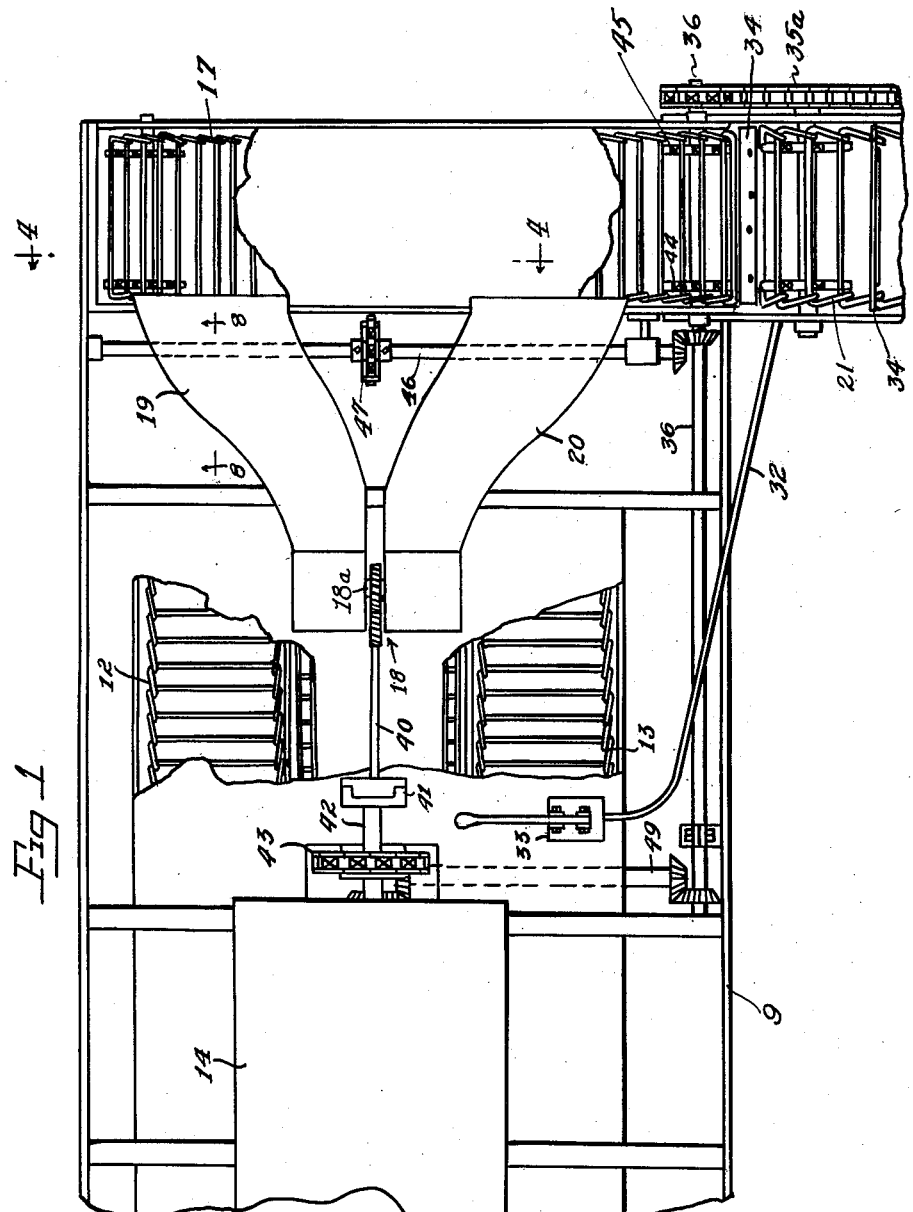
INVENTOR.
CLINTON H PETERSON
BY
Smith & Wells
Attys Dec. 16, 1952   C. H. PETERSON   2,621,456
POTATO DIGGER
Filed March 1, 1947   6 Sheets-Sheet 2
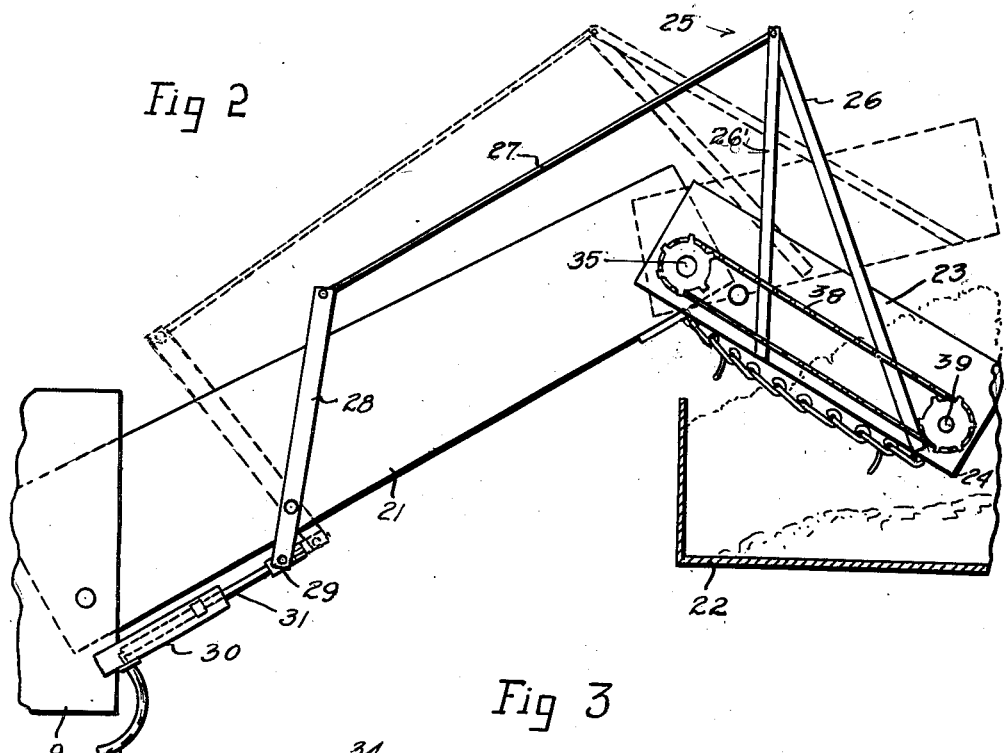
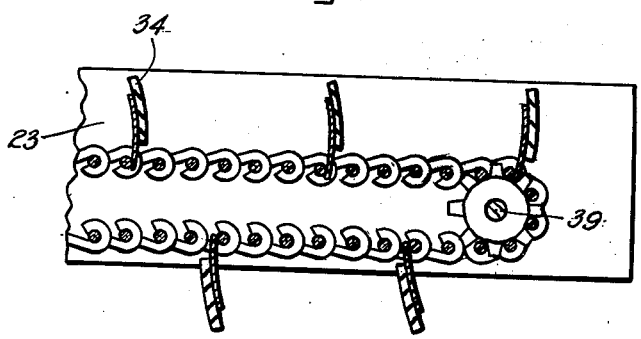
INVENTOR.
CLINTON H. PETERSON
BY
Smith & Wells
Attys Dec. 16, 1952     C. H. PETERSON     2,621,456
POTATO DIGGER Filed March 1, 1947     6 Sheets-Sheet 3

Inventor
CLINTON H. PETERSON
By Smith & Wells
Attorneys

Dec. 16, 1952     C. H. PETERSON     2,621,456
POTATO DIGGER

Filed March 1, 1947     6 Sheets-Sheet 4

INVENTOR.
CLINTON H. PETERSON
BY
Smith & Wells
Attys

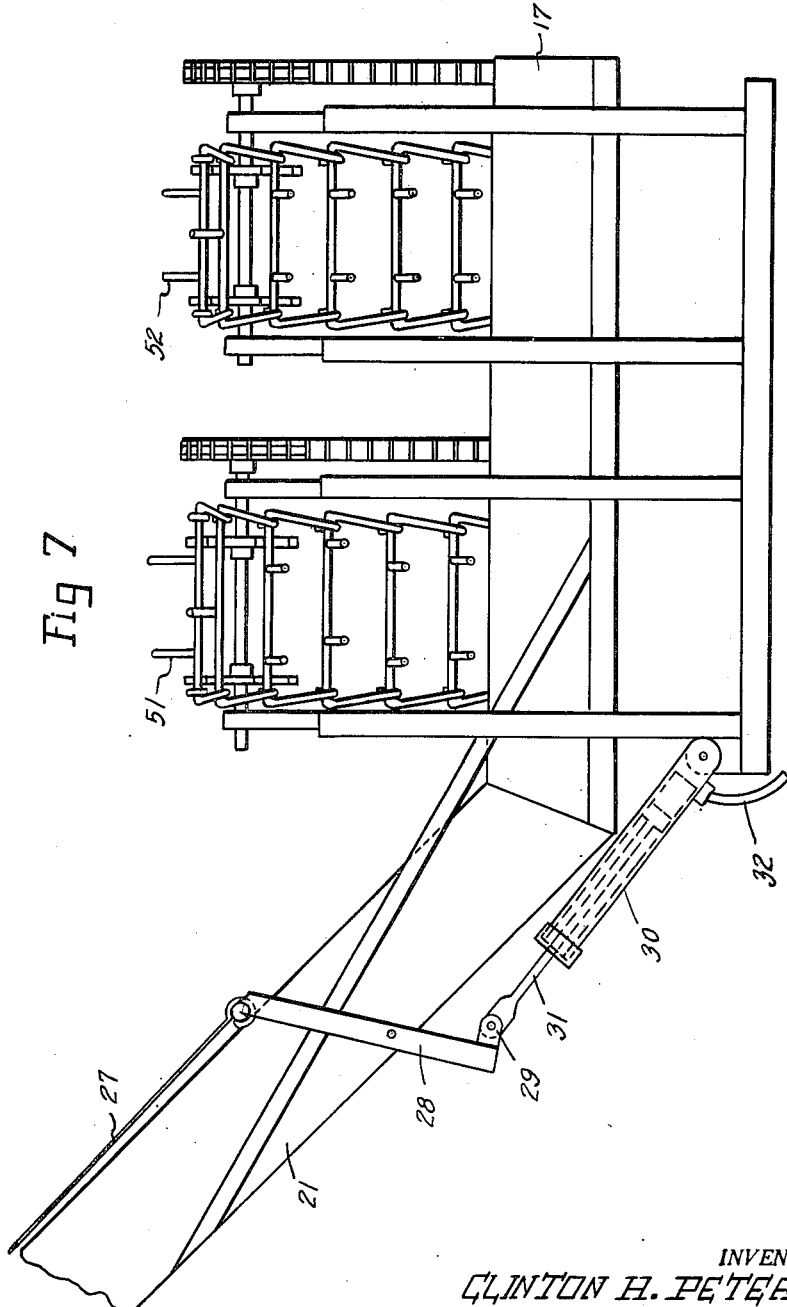

Dec. 16, 1952  C. H. PETERSON  2,621,456
POTATO DIGGER
Filed March 1, 1947  6 Sheets-Sheet 6
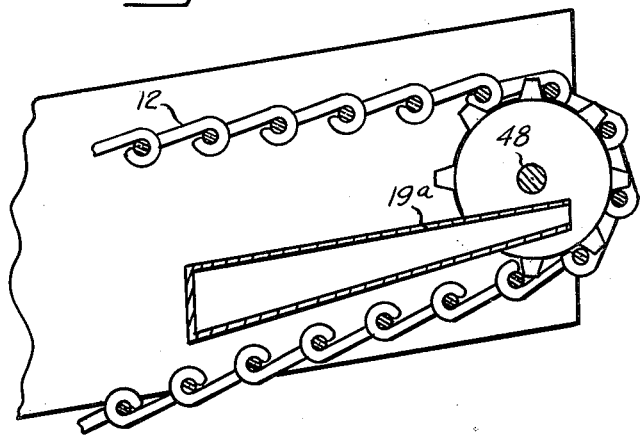
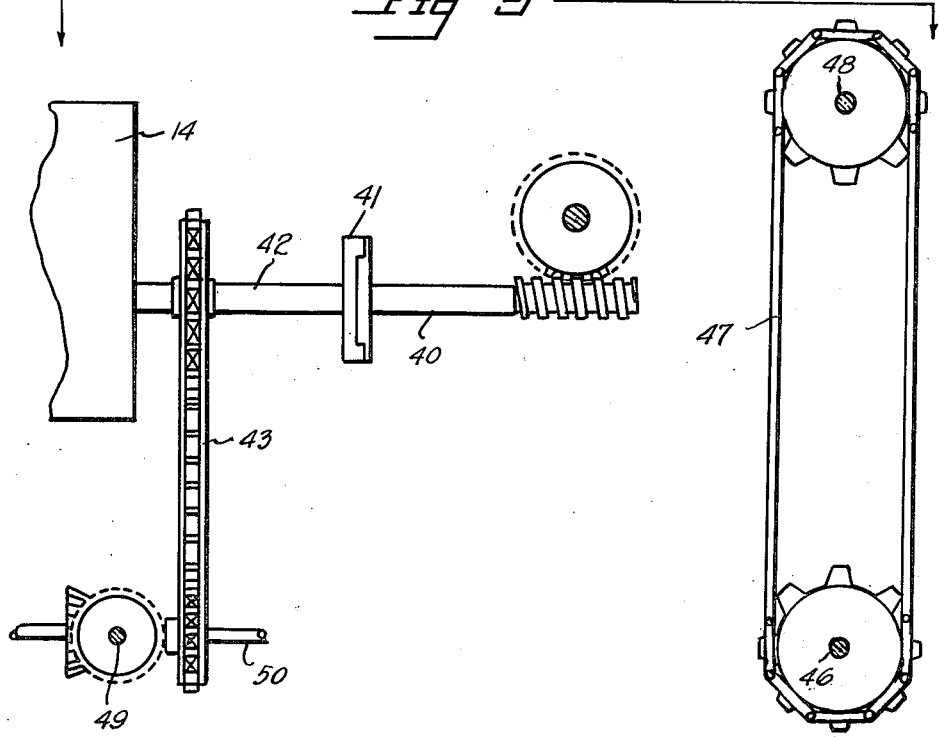
Inventor
CLINTON H PETERSON
By
Smith & Wells
Attorney

Patented Dec. 16, 1952

2,621,456

UNITED STATES PATENT OFFICE 2,621,456

POTATO DIGGER

Clinton H. Peterson, St. Anthony, Idaho

Application March 1, 1947, Serial No. 731,758

3 Claims. (Cl. 55—51)

My invention relates to improvements in a potato digger.

It is the principal purpose of my invention to provide certain novel improvements in a potato digger whereby the potatoes are dug from the ground and separated from the vines and dirt, then delivered into a truck or similar vehicle without allowing the potatoes to drop any substantial distance so that they will not be bruised or damaged. One of the great difficulties with the diggers with which I am familiar is the fact that at some point during their travel from the digging shovels to the vehicle in which they are carried away, the potatoes are treated roughly by being allowed to fall a substantial distance. Up to the time of my invention no potato harvesting equipment, to my knowledge, could successfully harvest the potatoes by bulk methods. One method had been to dig and sack on the digger and then transfer the heavy sacks to a vehicle. This invariably results in bruising the potatoes and such bruises are particularly damaging to the potatoes. The difficulty is that when the potato is first dug from the ground, it is rather tender and the bruise may break the skin or at least damage the surface of the potato sufficiently to start decay. Since potatoes are dug and stored for keeping over long periods of time and are oftentimes shipped under varying conditions, it is highly essential that bruising be avoided whenever possible. My invention provides means whereby the loading of the potatoes directly into a truck or other vehicle box when they are dug can be accomplished without allowing them to drop at the time of the filling of the vehicle box a distance which would be sufficient to damage them appreciably.

It is also a purpose of my invention to provide a novel means cooperating with the loading to remove vines and trash from the potatoes without bruising them.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 is a fragmentary plan view of the elevator conveyor system employed;

Figure 2 is a fragmentary side view of the loading elevator;

Figure 3 is an enlarged fragmentary sectional view of a portion of the loader;

Figure 7 is a rear end view of the machine shown in plan in Figure 6 with the loading elevator drive mechanism left off;

Figure 8 is a fragmentary sectional view taken on the line 8—8 of Figure 1, showing a modified arrangement of the air blast means; and Figure 9 is a diagrammatic view illustrating the driving mechanism employed.

Figure 6:
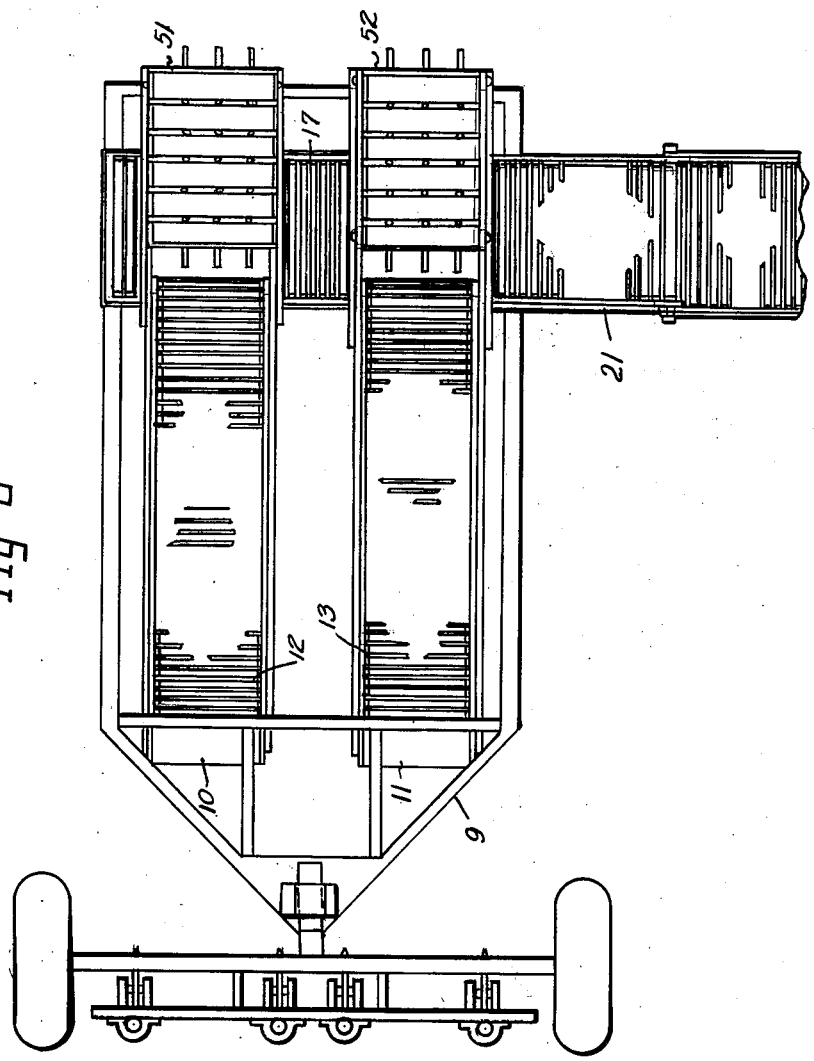
Figure 6 is a diagrammatic plan view of the digger and elevator mechanism of the machine showing it equipped with the usual vine and trash removers instead of my improved separating means.

My invention is shown applied to a potato digger of the general character above described wherein two adjacent digging shovels 10 and 11 (see Figure 6) and elevators 12 and 13 are mounted in a common frame 9 in a position to dig two rows of potatoes at a time. The frame carrying the diggers and elevators also carries a power unit 14 such as the usual internal combustion engine employed in tractors. The power unit is operably connected, as later described herein, to the elevators, and may have a separate connection (not shown) to the drive wheels which support the main weight of the frame. In connection with the elevators 12 and 13 a cross conveyor 17 is mounted closely beneath the upper ends of the elevators so as to receive the potatoes from the elevator and transfer them to one side of the machine. A fan unit 18 having outlets 19 and 20 is mounted between the elevators 12 and 13 and is arranged to direct a blast of air across the top of the conveyor 17 to remove vines, etc.

The cross conveyor 17 delivers the potatoes to a loading conveyor 21, 23 (see Figs. 1 and 2) which is of novel construction so that it may deliver the potatoes into a loading box 22 mounted on a suitable vehicle for travel alongside the digger. The loading conveyor is made in two sections, one being an elevator 21 which is rigidly supported from the main frame of the digger and of sufficient length to bring the potatoes to a level high enough to pass over the side of the vehicle box. At the upper end this elevator has pivoted thereto another section 23 which is initially lowered so that its free end 24 is slightly above the level of the floor in the vehicle to carry the potatoes downwardly and deliver them close to the floor at the beginning of the loading. It is necessary in order to avoid bruising the potatoes, to deliver them into the box at all times during the loading operation without their falling any substantial distance. Initially, in the loading, this outer section of the loading conveyor can be kept in its lower position and moved along the vehicle box until the floor of the box is covered to a substantial extent. The operator of the digger has a control mechanism 25 by which he can gradually lift the free end 24 of the outer section 23 of the loading conveyor as the load fills up the vehicle box. In this fashion the potatoes can be loaded uniformly in the box with the drop from the free end of the loading conveyor being at all times held at a safe limit that will not seriously damage the potatoes. The control mechanism 25 comprises a framework 26 including an arm 26' of the movable section 23, a link 27 leading from the framework, a yoke or lever arm 28 that is pivoted on the elevator 21 and secured at the top to the link 27, and an operating member 29 secured to the yoke 28 beneath the elevator 21. The operating member 29 is secured on the piston 31 of an hydraulic cylinder 30. The cylinder 30 is secured on the frame 9 beneath the elevator 21. A supply conduit 32 furnishes hydraulic fluid to the cylinder 30 from a pump 33 that is secured on the digger frame adjacent to the operator's position. The pump preferably is a conventional manually operable type with a release to permit the fluid return from the cylinder 30 when loading of a vehicle is completed and the movable section 23 is to be lowered into an empty vehicle box.

The elevator 21 and the movable conveyor section 23 have vanes 34, of rubber belting or similar material mounted thereon. These vanes are so arranged as to prevent the potatoes from rolling down the elevator 21 or the section 23 at such a rate as would damage them. The framework 26, the link 27 and the yoke 28 are so constructed as to be entirely out of the way of the conveyor. As shown best in Figures 1 and 2 the elevator section 21 is driven by a chain 35a from a drive shaft 36. The chain 35a drives a sprocket shaft 35 for the elevator 21. This shaft is in turn connected by a chain 38 to the lower shaft 39 of the conveyor section 23. The shaft 35 serves also as the pivot for the conveyor section 23.

The fan 18, which is shown as a double unit mounted on the shaft 18a, is connected by a drive shaft 40 and a suitable clutch mechanism 41 to the power shaft 42 of the power unit 14. The power unit 14 is also utilized by means of a chain drive 43 to operate the drive mechanism for the elevators 12 and 13, the cross conveyor 17 and the elevator 21. Figures 1 and 9 illustrate this drive mechanism best. The shaft 36 has sprocket wheels 44 and 45 thereon driving the conveyor 17. The shaft 36 drives a shaft 46 that is connected by a sprocket chain 47 to a shaft 48 that drives the elevators 12 and 13. The shaft 36 is driven by a cross shaft 49 that is geared to a stub shaft 50 that is driven by the chain 43.

Figure 4:
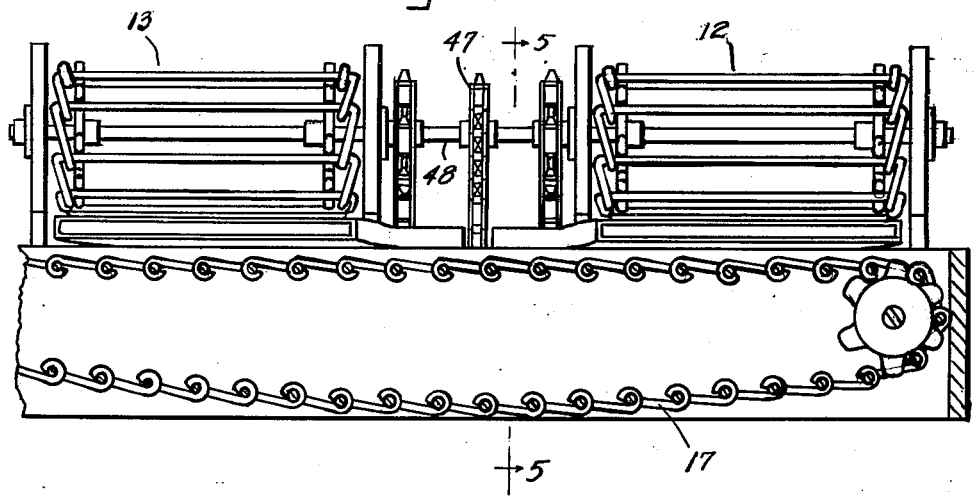
Figure 4 is an enlarged sectional view on the line 4—4 of Figure 1.

Referring now to Figures 2, 3 and 4, I have found that one of the greatest difficulties in the handling of the potatoes, particularly when the vines are wet, lies in the tendency of the vines to clog and interfere with the ordinary travel of the potatoes from the elevators 12 and 13, over the cross conveyor 17 to the delivery mechanism comprising the elevator 21 and the movable delivery conveyor section 23. It has been customary in the past to provide in potato diggers the vine removing conveyors such as is shown at 51 and 52 in Figures 6 and 7 of the drawings. The conveyors, however, must always travel in the opposite direction to the potatoes delivered from the elevators 12 and 13 to the cross conveyor 17. The vine removing conveyors do not work well when the vines are wet and are a source of continuous trouble. They are also a source of considerable damage to the potatoes since the fingers 53 thereof oftentimes strike the potatoes with such force as to damage them. If any of the fingers get broken, they must be replaced promptly or difficulty will result due to failure to remove the vines. Much of the material which is picked up with the potatoes is too small to be caught by the vine conveyors. I have, therefore, developed a method of removing vines and small sticks, dirt particles and the like which utilizes the fan 18 to provide a strong blast of air directly beyond each of the elevators 12 and 13 where they deliver the potatoes and vines to the cross conveyor 17. These blasts of air strike the material while it is falling and since the blasts are directed upwardly as well as rearwardly, they will blow all wet vines across the conveyor 17. The effect on the potatoes is to tend to remove loose dirt particles from them and to retard the falling of the potato because of the upward direction of the stream of air. The arrangement is such that the distance for the potatoes to fall from the outlet ends of the elevators 12 and 13 onto the conveyor 17 is kept at a minimum. In fact, the distance is substantially smaller than is commonly necessary where the vine removing conveyors 51 and 52 are used.

Figure 5:
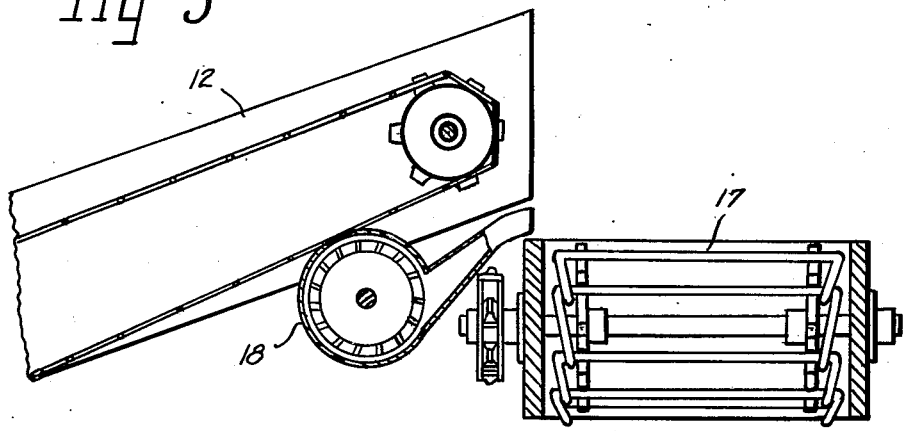
Figure 5 is a sectional view on the line 5—5 of Figure 4.

The air blast outlets 19 and 20 may be placed, as illustrated in Figures 1, 4 and 5 beneath the elevators 12 and 13. Alternatively they may be placed as shown in the sectional view, Figure 8, within the elevators at 19a. The ducts leading to the outlets go through one side wall of the elevator supporting frame.

The combination, in a loading device, of the air blast mechanism for separating the vines and trash from the potatoes as they fall from the elevators 12 and 13 to the cross conveyor 17, with the elevator 21 and movable lowering section 23 having the soft vanes 34, enables me to elevate and load the potatoes without bruising or damaging them after digging. The machine effects a great saving in the harvesting of potatoes. It saves time. One operator can run the machine. It puts the potatoes in the truck without bruising them and disposes of the vines and trash, wet or dry.

It is believed that the nature and advantages of my invention will be clear from the foregoing description. Having thus described my invention, I claim:

1. In a potato digger having means to dig the potatoes and a conveyor operable to move the dug potatoes upwardly and rearwardly from the digging means, loading means operable to deliver the potatoes as dug and elevated into a vehicle box travelling with the digger, said loading means comprising conveying and elevating means to which the potatoes are delivered by the first named conveyor, a lowering conveyor having its receiving end in juxtaposition to the delivery end of said conveying and elevating means and pivoted to said delivery end and manual control mechanism adapted to lift the free end of said lowering conveyor as the load in the vehicle box builds up, said mechanism comprising an upwardly extending framework on the lowering conveyor, a link extending from the top of said framework over the elevating means, a yoke pivoted on the elevating means to which the link is attached and means to swing the yoke on its pivot, said lowering conveyor having means thereon to keep the potatoes from rolling off the lowering conveyor until they are delivered substantially to the free end thereof.

2. In a potato digger having means to dig the potatoes and a conveyor operable to move the dug potatoes upwardly and rearwardly from the digging means, loading means operable to deliver the potatoes as dug and elevated into a vehicle box travelling with the digger, said loading means comprising conveying and elevating means to which the potatoes are delivered by the first named conveyor, a lowering conveyor having its receiving end in juxtaposition to the delivery end of said conveying and elevating means and pivoted to said delivery end, manually controlled power means for swinging the lowering conveyor about its pivot to follow the level of potatoes loaded in the vehicle box, said lowering conveyor having transverse vanes of yielding material thereon to keep the potatoes from rolling off the lowering conveyor until they are delivered substantially to the free end thereof.

3. In a potato digger having means to dig the potatoes and a conveyor operable to move the dug potatoes upwardly and rearwardly from the digging means, loading means operable to deliver the potatoes as dug and elevated into a vehicle box travelling with the digger, said loading means comprising conveying and elevating means to which the potatoes are delivered by the first named conveyor, a lowering conveyor having its receiving end in juxtaposition to the delivery end of said conveying and elevating means and pivoted to said delivery end, said lowering conveyor having spaced upstanding transverse yielding vanes thereon, and means to raise the delivery end of the said lowering conveyor as the loading progresses comprising an arm fixed on the lowering conveyor and extending upwardly above the upper end of the elevating means, a lever arm on the elevating means, a link connecting the upper ends of said arms, and manually controlled means for swinging said lever arm.

CLINTON H. PETERSON.

REFERENCES CITED

The following references are of record in the file of this patent:

UNITED STATES PATENTS

| Number | Name | Date |
|---|---|---|
| Re. 17,769 | Morris | Aug. 12, 1930 |
| 612,297 | Wrightson | Oct. 11, 1898 |
| 1,072,218 | Fanger | Sept. 2, 1913 |
| 1,114,112 | Cizek | Oct. 20, 1914 |
| 1,518,759 | Sayers | Dec. 9, 1924 |
| 1,715,218 | Wright | May 28, 1929 |
| 2,093,920 | McCoy | Sept. 21, 1937 |
| 2,267,419 | Oster | Dec. 23, 1941 |
| 2,379,198 | Templeton | June 26, 1945 |

FOREIGN PATENTS

| Number | Country | Date |
|---|---|---|
| 786,699 | France | June 17, 1935 |
| 449,058 | Great Britain | June 19, 1936 |